United States Patent Office 3,415,636
Patented Dec. 10, 1968

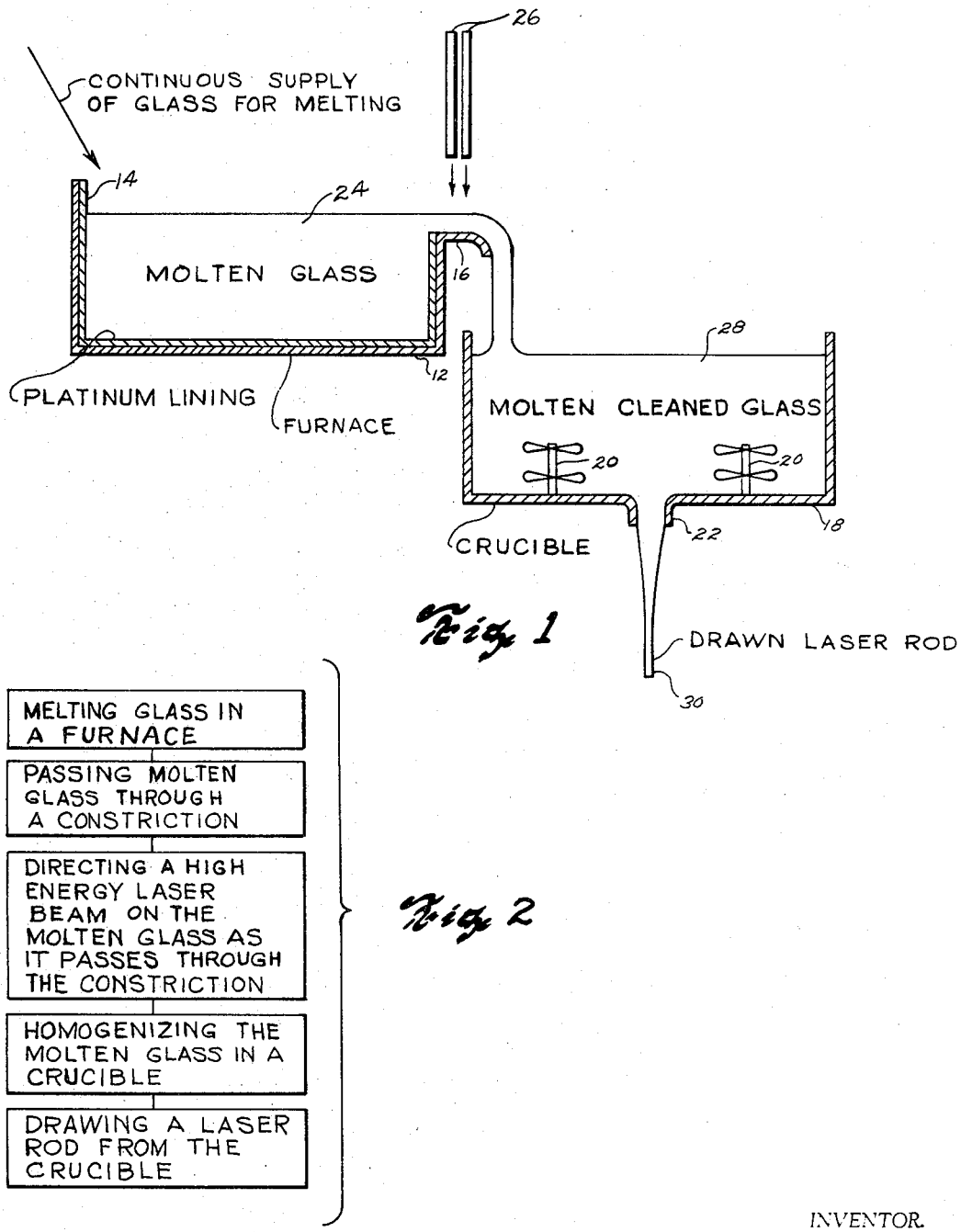

3,415,636
METHOD FOR TREATING MOLTEN GLASS WITH A LASER BEAM
Lee O. Upton, Sturbridge, Mass., assignor, by mesne assignments, to American Optical Corporation, a corporation of Delaware
Filed Sept. 28, 1964, Ser. No. 399,934
3 Claims. (Cl. 65—17)

ABSTRACT OF THE DISCLOSURE

A method of removing furnace refractory inclusions from melts of laser glass by causing the melt to flow, in the form of an attenuated ribbon exposed to the atmosphere, through the path of a laser beam directed thereon with an energy level sufficient to penetrate the ribbon and vaporize the refractory inclusions causing them to dissipate into the atmosphere. The energy level of the laser beam is preferably at least equal to that intended to be developed in laser devices subsequently formed from the glass melt so as to remove all inclusions which would tend to expand and cause cracking of the devices during use.

---

This invention relates to a method for refining glass and more particularly to a method and illustrative apparatus instrumental in producing a finished laser rod which is devoid of harmful refractory inclusions, which tend to affect the ability of the laser rod to withstand the high energy levels attained by the device.

It is well known in the glass furnace art that such refractory materials as platinum are quite useful as coatings or linings for the inside of a high-temperature furnace. Platinum is a refractory or temperature resistant material which is largely inert to glass compositions. Furthermore, platinum is a re-usable refractory which is not consumed by use in the furnace in the same way as other refractory materials. If the platinum lining of a furnace eventually becomes perforated, a simple refining process is used to restore the platinum to usefulness as a furnace coating. All of these factors lead to the conclusion that platinum is an inexpensive and efficient refractory which is preferred by most for use in the glass industry.

However, during the past few years, since the introduction of the use of glass as laser material, it has been found that when the laser glass, such as a neodymium doped glass, is in the molten form at a temperature above approximately 1300° C., a platinum vapor ($PtO_2$) is formed and when the glass is cooled on annealing to 1000° C., said vapor deoxidizes and is included in the glass product as a solid. When the glass is drawn into a laser rod, the solid platinum particles that are thereby present cause a multitude of problems, which have almost counterbalanced the above-cited advantages of the use of platinum as a refractory. For example, when energies of 1000 or more joules per square centimeter are developed by the final laser rod, enough energy is absorbed by the platinum inclusions in the final rod to cause them to volatilize and expand, which results in a cracked laser rod. Other refractory inclusions such as kyanite, clay, or zirconia are included in the aforementioned and other ways and are also absorptive of the laser energy, but only with energies upwards of 10,000 joules per square centimeter in a laser rod of approximately 18 millimeters diameter. It is seen, therefore, that the major problem concerns the platinum refractory inclusions rather than others and the elimination of such inclusions is, therefore, the main object of the present invention.

A further more specific object of the present invention is to provide a method whereby platinum and other inclusions are eliminated from the laser glass prior to its fabrication into rod form.

These and other objects are accomplished in one preferred embodiment of the invention wherein laser glass is melted in a furnace and then passed through a constriction, at which time a continuous or pulsed laser beam is directed thereon with an energy output similar to that which causes volatilization of most inclusions present in the final laser rod. The molten glass, with the refractory and other inclusions eliminated, is then homogenized in a lower temperature crucible and a laser rod or tube drawn therefrom to produce the final product.

Further objects, features, and advantages of the present invention will be apparent from the following more detailed description and accompanying drawings wherein:

FIG. 1 is a diagrammatic representation of the furnace and drawing apparatus useful in the accomplishment of the method according to the present invention; and FIG. 2 is a block chart of the steps of the method.

Referring first to FIG. 1, a glass-melting furnace 12 is shown with a lining 14 of platinum and a constricted outlet portion 16. The molten glass flows from the constriction 16 to a crucible 18, which has mixing apparatus 20 for homogenizing the glass before it is drawn from the crucible outlet 22.

In the prior art, glass is heated in a furnace to temperatures above 1300° C. and if a platinum lining is used for the furnace, the platinum reacts by oxidizing and vaporizing to form $PtO_2$ vapor, which is trapped in the glass melt. When the glass is subsequently cooled to below 1000° C., the platinum deoxidizes and stays in the melt as a solid. The apparatus of FIG. 1 is illustrative of the apparatus that may be used to practice a method according to the present invention, which insures that the final laser rod 30 will not contain solid platinum particles or other refractory inclusions. According to one aspect of the invention, glass is fed to furnace 12 and heated to the necessary temperature for melting the glass and the molten glass 24 flows through constriction 16 to produce an attenuated ribbon which can readily be penetrated. At this point, a beam of energy from laser apparatus 26 is directed at the attenuated glass to impart to the refractory inclusions energy levels of 10,000 joules per square centimeter or more in order to vaporize and expand those inclusions, which explode upward thereby be dissipated into the atmosphere from the uncovered constriction 16. The laser apparatus 26 comprises either a single laser rod of the continuously radiating type or a series of pulsating radiation producing laser rods, which are alternately pulsed and of a higher energy capability than the continuous type, in order to completely eliminate the inclusions as previously mentioned.

As the molten glass flows from the constriction 16 to the crucible 18, it is cooled to a temperature of about 1000° C., thereby eliminating the need for a platinum lining in the crucible. The molten cleaned glass 28 is homogenized by mixing apparatus 20, and the laserable glass rod 30 is then drawn from the outlet 22.

The drawn rod 30 may attain energy output levels similar to that attained by the laser apparatus 26 without danger of exploding inclusions, since the inclusions are pre-exploded as the molten glass 24 flows through constriction 16.

It is, therefore, seen that a method such as that depicted by FIG. 2 is a satisfactory method for refining glass for use as a laser rod material, which avoids the danger of platinum or other inclusion explosions when the final product is used to produce high energy levels. In FIG. 2, the method is shown as comprising the steps of: melting glass in a platinum-lined furnace, passing the molten glass through an uncovered constriction, directing a high energy laser beam or beams on the molten glass as it passes through the constriction, homogenizing the molten glass in a lined crucible, and drawing a laser rod from the crucible. For the accomplishment of the purposes of this invention, it is necessary that the energy output of laser apparatus 26 be approximately the same as or greater than the energy output expected to be produced by the drawn laser rod 30, when it is completed as a laser energy producing device.

I claim:

1. A method for refining laser glass comprising the steps of:
    melting the laser glass in a furnace, there being furnace refractory inclusions in the melted glass;
    causing the molten glass to flow from the furnace in the form of an attenuated ribbon readily penetrable by a given level of laser output energy, said ribbon being exposed to the atmosphere;
    penetrating the exposed ribbon of molten glass with laser output energy continuously as the glass flows from the furnace to vaporize said furnace refractory inclusions causing them to be dissipated into the atmosphere to which said ribbon is exposed; and
    homogenizing the glass of said ribbon following said dissipation of said refractory inclusion.

2. The method of claim 1 with a final step of drawing said glass after said homogenization thereof.

3. The method of claim 1 wherein said furnace refractory inclusions include platinum and said level of said laser output energy is substantially equal to the level of energy desired to be attained by a laser device to be fabricated of the laser glass refined by the method of claim 1.

References Cited

UNITED STATES PATENTS

| | | | |
|---|---|---|---|
| 1,893,061 | 1/1933 | Peiler | 65—337 |
| 2,990,438 | 6/1961 | Lambert et al. | 65—337 |
| 2,998,335 | 8/1961 | Dehmelt. | |
| 3,217,088 | 11/1965 | Steierman | 65—40 XR |
| 3,265,855 | 8/1966 | Norton | 219—121 |

OTHER REFERENCES

Industrial Heating, February 1963, article entitled "The Laser and Its Metallurgical Applications." A copy may be found in the Patent Office in class 219, subclass 121.

S. LEON BASHORE, *Acting Primary Examiner.*

F. W. MIGA, *Assistant Examiner.*

U.S. Cl. X.R.

65—64, 126, 134, 181, 187, 337, 346, 374; 331—94.5; 219—121